(12) United States Patent
Richardson et al.

(10) Patent No.: US 7,461,852 B2
(45) Date of Patent: Dec. 9, 2008

(54) STEP DEVICE FOR ASSISTING ENTRY INTO VEHICLES

(75) Inventors: Wayne Richardson, Chino Valley, AZ (US); Kevin Baker, Prescott Valley, AZ (US)

(73) Assignee: Performance Automotive Group, Inc., Chino Valley, AZ (US)

( * ) Notice: Subject to any disclaimer, the term of this patent is extended or adjusted under 35 U.S.C. 154(b) by 0 days.

(21) Appl. No.: 11/690,465

(22) Filed: Mar. 23, 2007

(65) Prior Publication Data

US 2008/0231013 A1 Sep. 25, 2008

(51) Int. Cl.
*B60R 3/00* (2006.01)
(52) U.S. Cl. ..................... 280/163; 280/169
(58) Field of Classification Search ............... 280/163, 280/166, 169; 296/151
See application file for complete search history.

(56) References Cited

U.S. PATENT DOCUMENTS

| | | | |
|---|---|---|---|
| 1,043,715 A | 11/1912 | Mitchell | |
| 1,045,715 A | 11/1912 | Mitchell | |
| 1,212,572 A | 1/1917 | Sheridan | |
| 2,559,123 A | 7/1951 | Jackson | |
| 3,210,110 A | 10/1965 | Cheiger | |
| T977,005 I4 | 12/1978 | Sidles, Jr. | |
| 4,200,303 A | 4/1980 | Kelly | |
| 4,610,458 A | 9/1986 | Garnham | |
| 4,639,032 A | 1/1987 | Barbour | |
| D293,667 S | 1/1988 | Weiler | |
| 4,935,638 A | 6/1990 | Straka | |
| 4,943,085 A | 7/1990 | Straka | |
| 5,046,582 A | 9/1991 | Albrecht | |
| 5,137,293 A | 8/1992 | Graves | |
| 5,193,826 A | 3/1993 | Holloway | |
| 5,732,996 A | 3/1998 | Graffy | |
| 5,895,064 A | 4/1999 | Laubach | |
| 6,017,045 A | 1/2000 | Dermody | |
| D437,818 S | 2/2001 | Mothersele | |
| D440,931 S | 4/2001 | Knight, III | |
| 6,422,342 B1 | 7/2002 | Armstrong | |
| 6,435,534 B1 | 8/2002 | Stone | |
| 6,588,783 B2 * | 7/2003 | Fichter | 280/169 |
| 6,874,801 B2 | 4/2005 | Fichter | |
| D536,651 S * | 2/2007 | Polka | D12/203 |
| D546,745 S * | 7/2007 | Storer | D12/203 |
| 2005/0127635 A1 | 6/2005 | Fichter | |

* cited by examiner

*Primary Examiner*—Paul N. Dickson
*Assistant Examiner*—Bridget Avery
(74) *Attorney, Agent, or Firm*—Snell & Wilmer L.L.P.

(57) ABSTRACT

The invention includes a step device for assisting entry into and/or exit from a vehicle such as, for example, high road clearance truck. The step device comprises a generally "W" shaped bar which is separable into said two generally "U" shaped elements for easier packaging, shipping and manipulation of the device. Each of the "U" shaped elements include a cross-bar fixedly attached between, and spanning across, an interior of the generally "U" shaped element. The cross-bars are configured for separately mounting to the vehicle such that the generally "U" shaped elements are independently supported and the generally "U" shaped elements may be adjustable to multiple angles with respect to said vehicle.

8 Claims, 6 Drawing Sheets

STEP DEVICE FOR ASSISTING ENTRY INTO VEHICLES

FIELD OF INVENTION

The invention generally relates to a vehicle accessory, and more particularly, to a multi-component, adjustable step for assisting entry into a vehicle.

BACKGROUND OF THE INVENTION

It is often desirable to have vehicles with high ground clearance to, for example, maneuver rough terrain, support heavy loads, or provide a better view of a driving surface. High ground clearance may also be esthetically pleasing. However, high ground clearance typically increases the difficulty of entering into and exiting from the vehicle, especially for shorter persons, or those having physical disabilities. As such, a need exists for an apparatus that assists with entry into and exit from vehicles.

SUMMARY OF THE INVENTION

The invention includes a step device for assisting entry into and/or exit from a vehicle. In one embodiment, the step device is configured for assisting entry into and/or exit from a high road clearance truck. The step device comprises a generally "W" shaped bar which is separable into two generally "U" shaped elements for easier packaging, shipping and manipulation of the device. Each of the "U" shaped elements include a cross-bar fixedly attached between, and spanning across, an interior of the generally "U" shaped element. The cross-bars are configured for separately mounting to the vehicle such that the generally "U" shaped elements are independently supported. In one embodiment, the cross-bar may mount to the vehicle via a support bracket mounted to an "L" bracket. In an exemplary embodiment, the generally "U" shaped elements may be adjustable to multiple angles with respect to said vehicle by rotating the support bracket about the "L" bracket.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The detailed description of exemplary embodiments herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The invention includes a step device 1 for assisting entry into and/or exit from a vehicle. In one embodiment, step device 1 is configured for assisting entry into and/or exit from a high road clearance truck. One skilled in the art will appreciate that the step device may be incorporated into any portion of any object, structure, vehicle or device, wherein similar features, designs and functions as described herein would be beneficial. For example, step device 1 may be incorporated into a loading dock platform to assist with entry up and onto the loading dock. In another example, step device 1 may be attached to the back or front of a truck to both serve as a step and a bumper. In addition to assisting entry, the step device may provide a protective apparatus for the underside, side or other areas on a vehicle. Furthermore, due to the unique "W" configuration, the step device more appropriately outlines the entry point into a vehicle with an open door. In other words, after opening the door to the entry way, the open door may align with the front portions of the "W".

Figure 1:
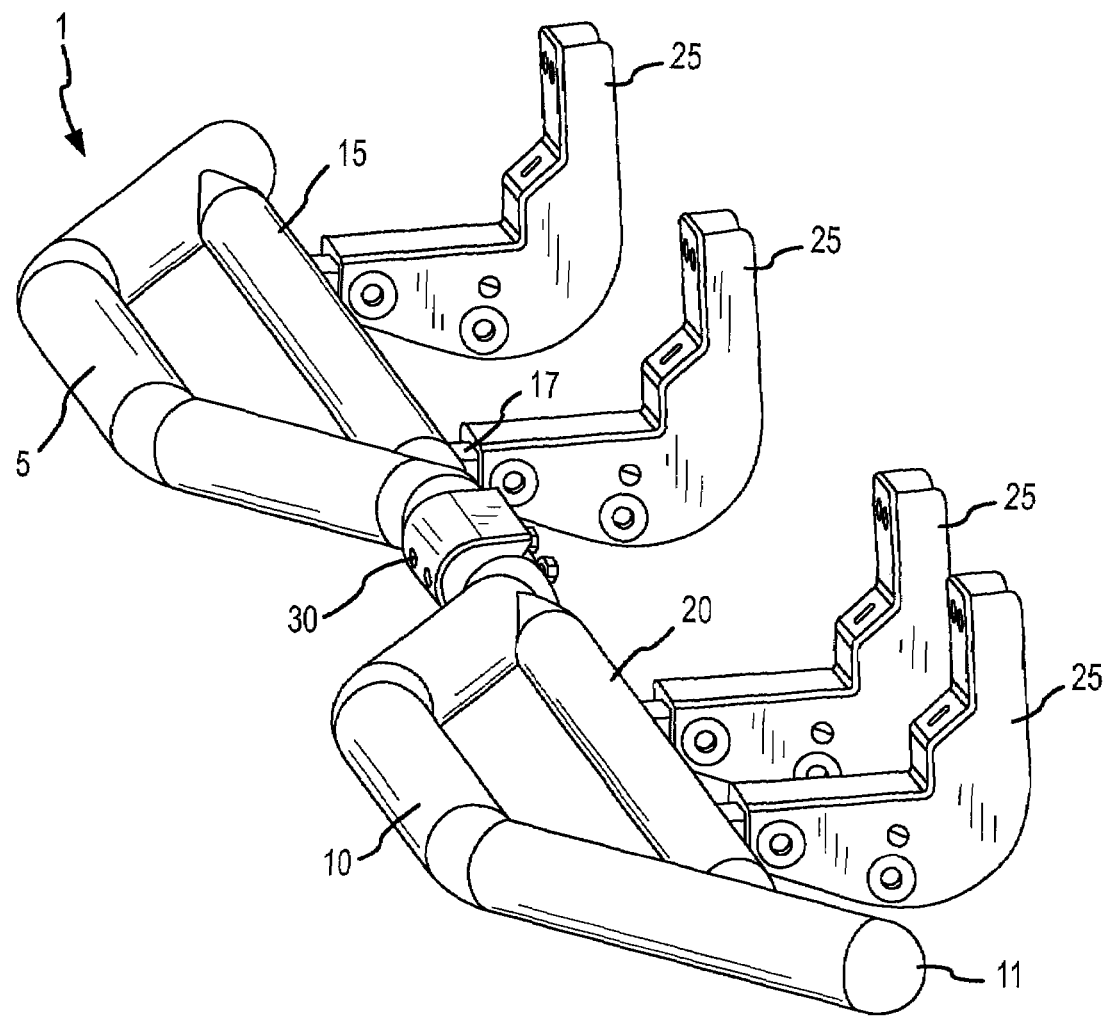
FIG. 1 is a diagram showing the components of the invention assembled in accordance with an exemplary embodiment of the present invention.

With respect to FIG. 1, in exemplary embodiments of the invention, step device 1 comprises a first U-shaped member 5, a second U-shaped member 10, a connecting bracket 30, an internal connecting sleeve 35 (not shown), a first cross-bar 15, a second cross-bar 20, support brackets 17, and L-shaped brackets 25. Any of the components may be coupled to each other via bolts, dowels, welding, soldering, brazing, sleeves, brackets, clips or other means known in the art or hereinafter developed. The coupling may be permanent or temporary, and the coupling may include an adjustable coupling, thereby allowing the components to be extended away from each other or closer to each other.

In an exemplary embodiment, the generally W-shaped step device is comprised of two generally U-shaped members 5, 10 which are configured to attach to each other. Exemplary advantages of the present invention include the step device being comprised of smaller components to facilitate easier packaging, shipping and manipulation of the device. Moreover, the two separate U-shaped members 5, 10 enable independent mounting and angling of each U-shaped member. The overall dimensions of the W-shaped component are chosen based on the intended use of the step device. Moreover, the number of U-shaped members 5 may be increased (and connected to each other in a similar manner set forth herein) based on the device to which the step device is mounted. Because each U-shaped member is independently supported, only one U-shaped member may be used to form the step device apparatus of this invention.

One skilled in the art will appreciate that the configuration may deviate from the "W" and "U" configuration, but the general features still exist. For example, the arms connecting the two "U" components may include a straight portion to facilitate connecting the two portions. Moreover, the outer arms of the "W" may be longer than the inner angled arms such that the outer arms extend under the vehicle to avoid the user from slipping off of the end of the arm or getting his foot stuck between the end and the vehicle. In an exemplary embodiment, the angles between the components that form the "U" are about 25 degrees, but the angles may be in the range of about 20-30 degrees.

The generally U-shaped members 5, or any other component described herein, may be made of any high strength material including steel, aluminum, glass, wood, stainless steel and/or composites. The material finish, if any, may be chrome, polished metal, powder coating, plating and/or the like. The cross section of the U-shaped members, or any other component described herein, may be a circle, square, rectangle, triangle, oval, ellipse or any other suitable shape. Further, the U-shaped members may or may not be hollow. In an exemplary embodiment, hollow drawn over mandrel steel is used to form the U-shaped members 5, each having a circular cross section with a thickness of about 0.120 inches. In one embodiment, the diameter of the U-shaped members may be in the range of about 1-4 inches, and in an exemplary embodiment, is about 2.5 inches. In one embodiment, the circumference of the U-shaped members is in the range of about 3.14-12.56 inches, and in one exemplary embodiment, is about 7.85 inches.

In some embodiments, the U-shaped members 5 have a flat upper surface or a non-skid material attached thereto to permit use as a step. Other accessories, electronics and/or the like may be added onto, or incorporated into U-shaped members 5, or any other component discussed herein. For example, lights, message boards, advertising and/or the like may be incorporated into the U-shaped members 5.

Figure 3:
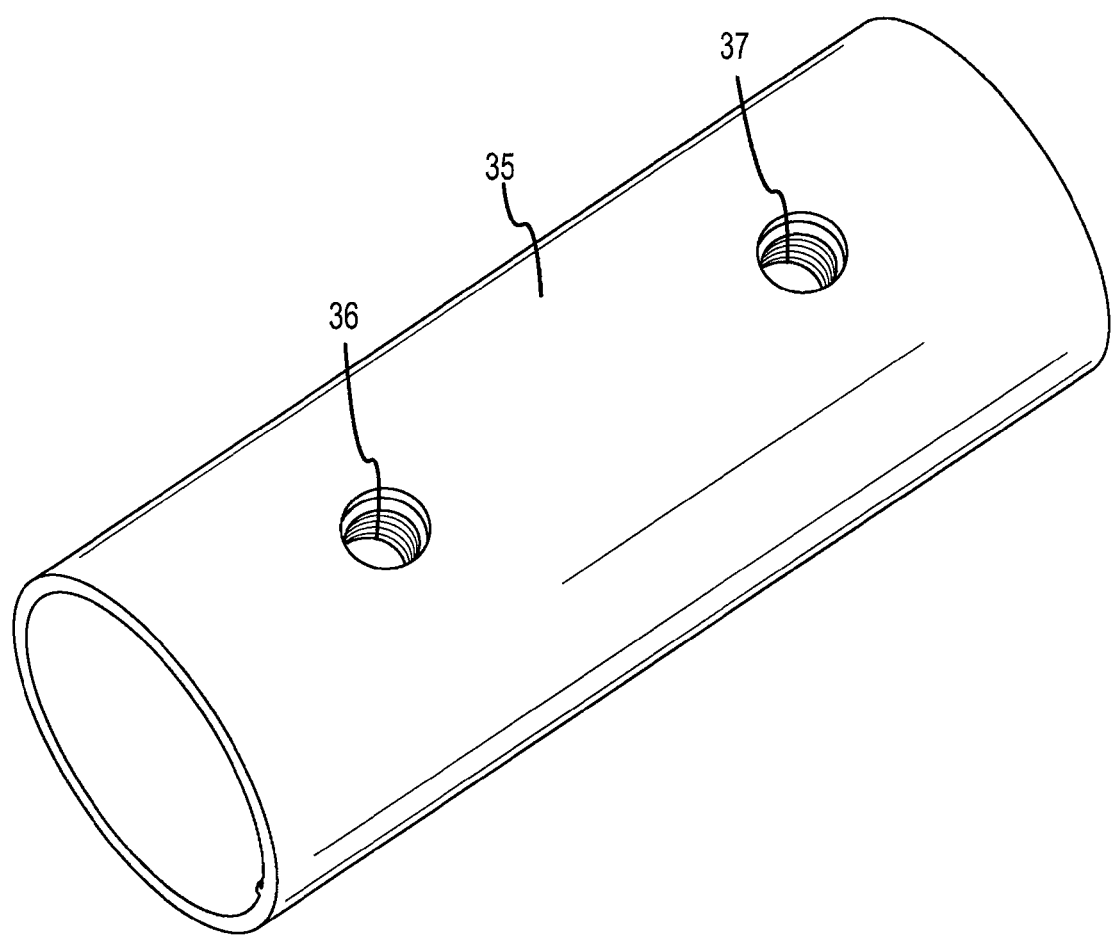
FIG. 3 is a diagram of a connecting sleeve in accordance with an exemplary embodiment of the present invention.

The generally U-shaped members 5 are coupled via any device or method suitably configured to fixedly or removably attach two items. In an exemplary embodiment, U-shaped members 5 are coupled with an internal connecting sleeve 35 (as best shown in FIG. 3) and/or an external connecting bracket 30. Connecting sleeve 35 provides flexing and bending support between the two U-shaped members 5, 10.

Figure 2:
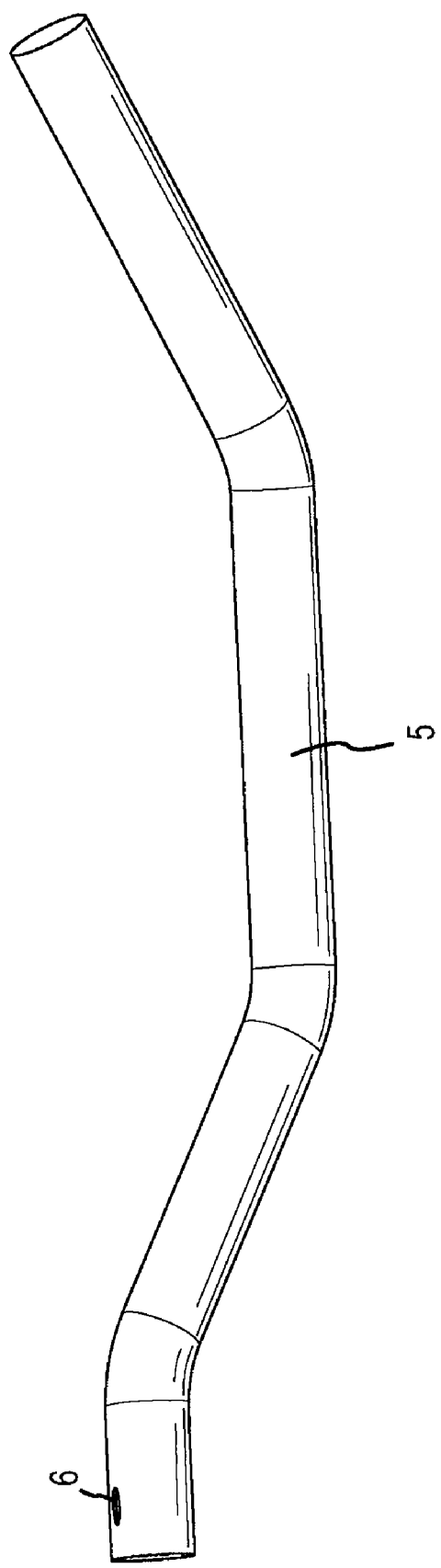
FIG. 2 is a diagram of a U-shaped member in accordance with an exemplary embodiment of the present invention.
Figure 4:
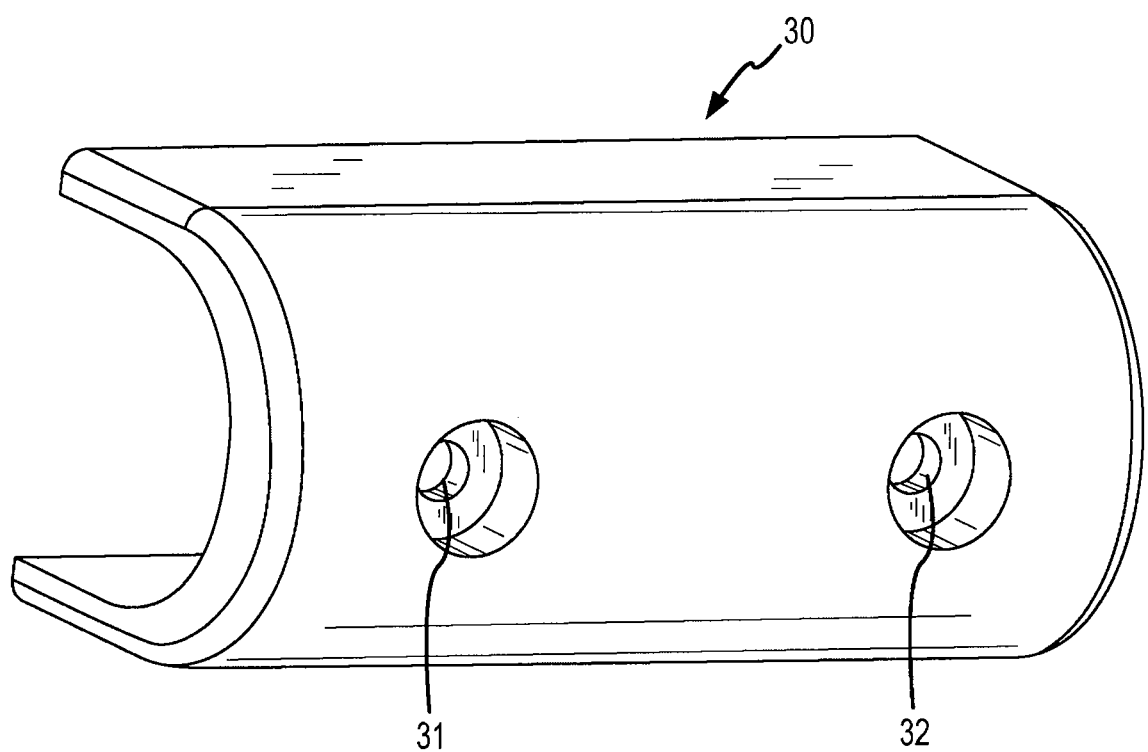
FIG. 4 is a diagram of a connecting bracket, identification plate and/or decorative cover over the connection location of the U-shaped members in accordance with an exemplary embodiment of the present invention.

More particularly, a first U-shaped member 5 and a second U-shaped member 10 are coupled with a connecting sleeve 35, by inserting a bolt or the like through hole 6 in the U-shaped members 5 and 10 and holes 36 and 37 in the internal connecting sleeve 35, as best shown in FIGS. 1, 2 and 3. U-shaped members 5 and 10 are coupled in such a way that the resulting combination is a W-shaped step device as shown in FIG. 1. Connecting bracket 30 may optionally be connected at the joint of U-shaped members 5 and 10 by use of a bolt or the like through holes 31 and 32 in the connecting bracket 30 in such a way that the joint is hidden from view, as shown in FIGS. 1 and 4. Cap member 11 may optionally be inserted at the end of U-shaped members 5 and 10, as shown in FIG. 1.

As shown in FIG. 1, cross-bars 15 and 20 are attached to the inside of U-shaped member 5 and 10, respectively. The cross-bars may be connected so as to provide structural support for U-shaped members 5 and 10 and to provide an area for attaching the mounting components. Cross-bars 15, 20 may be attached to U-shaped members 5 and 10 at any location along U-shaped member. In one embodiment, cross-bar 15 is attached at the open top of the "U" on the internal arm and below the end on the outside arm of the "U."

Figure 5:
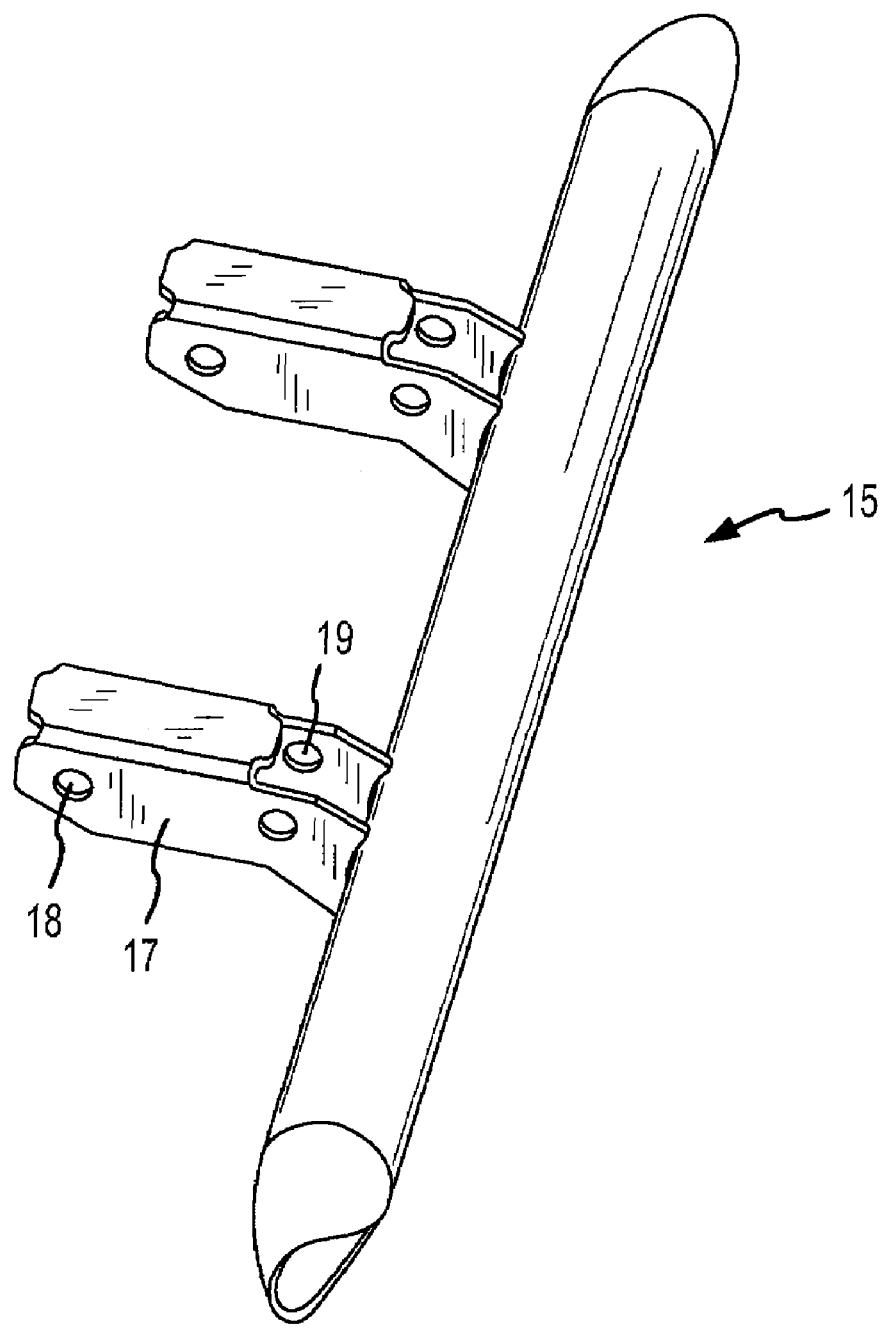
FIG. 5 is a diagram of a support member and support bracket connectors in accordance with an exemplary embodiment of the present invention.
Figure 6:
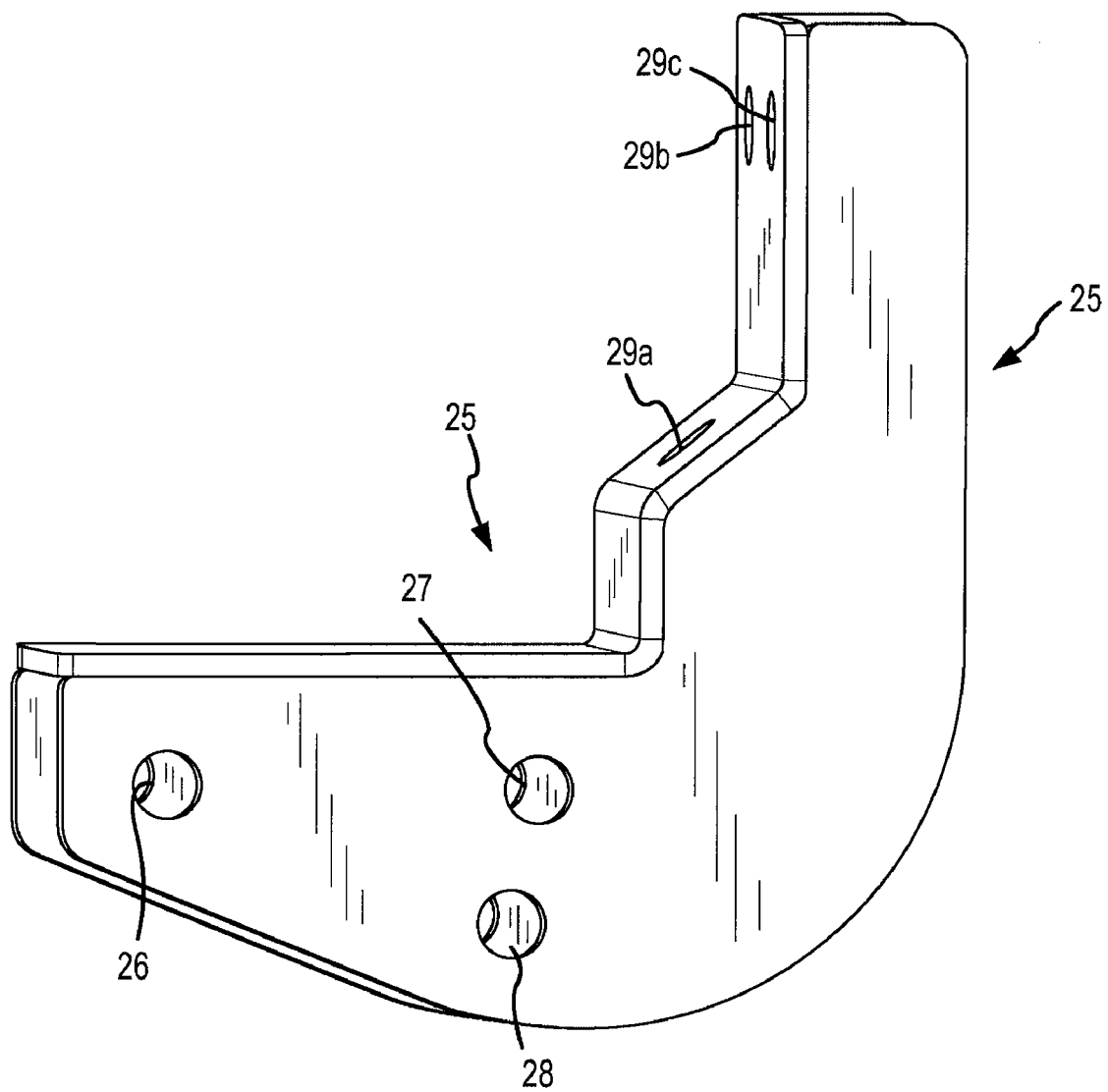
FIG. 6 is a diagram of an L-shaped support bracket in accordance with an exemplary embodiment of the present invention.

With respect to FIG. 5, support bracket 17 is attached to cross bar 15. Support bracket 17 provides a means for attachment to L-shaped support bracket 25. Referring now to FIGS. 1, 5 and 6, support bracket 17 and L-shaped bracket 25 are aligned such that they may be connected to each other through by use of a bolt, in one embodiment, hole 19 in support bracket 17 and hole 26 in said L-shaped support bracket 25. Support bracket 17 and L-shaped bracket 25 are further aligned such that they may be connected to each other by use of a bolt through hole 18 in said support bracket connector 17 and either hole 27 or 28 in said L-shaped support bracket 25 so as to provide for adjusting the angle of attachment of the step device 1. Holes 27 or 28 may include more than two holes or an open channel wherein the bolt may tighten anywhere along the channel, thereby increasing the number of angles from which step device 1 may be attached. In one embodiment, step device 1 may be attached at any angle in the range of about 0-30 degrees. L-shaped support bracket 25 is attached to the sheet metal and/or chassis of a vehicle by use of a bolt or the like through holes 29a, 29b and 29c.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

What is claimed is:

1. A step device for assisting at least one of entry into and exit from a vehicle, said step comprising: a first generally "U" shaped element and a second generally "U" shaped element, wherein said first generally "U" shaped element has a first cross-bar fixedly attached between an interior of said first generally "U" shaped element, wherein said second generally "U" shaped element has a second cross-bar fixedly attached between an interior of said second generally "U" shaped element, wherein each of said cross-bars is configured for independently mounting to said vehicle, and wherein said first and second generally "U" shaped elements join together to form a generally "W" shaped step.

2. The device of claim 1, wherein said generally "W" shaped step is separable into said first and second generally "U" shaped elements.

3. The device of claim 1, wherein a connecting bracket and a connecting sleeve join together said first and second generally "U" shaped elements to form said generally "W" shaped step.

4. The device of claim 1, wherein said generally "W" shaped step is configured to be adjustable to multiple angles with respect to said vehicle without removing said generally "W" shaped step from said vehicle.

5. The device of claim 1, wherein each of said first and second generally "U" shaped elements is configured to be independently adjustable to multiple angles with respect to said vehicle without removing either of said first and second generally "U" shaped elements from said vehicle.

6. The device of claim 1, wherein each of said first and second generally "U" shaped elements is independently supported.

7. The device of claim 1, wherein said first cross-bar is configured for mounting to said vehicle via first and second support brackets mounted to first and second "L" brackets.

8. The device of claim 7, wherein said first generally "U" shaped element is configured to be adjustable to multiple angles with respect to said vehicle by rotating said first and second support brackets about said first and second "L" brackets.

* * * * *